United States Patent
Suzuki

(10) Patent No.: US 6,193,497 B1
(45) Date of Patent: Feb. 27, 2001

(54) HONEYCOMB EXTRUSION DIE

(75) Inventor: Kazuo Suzuki, Inazawa (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/034,022

(22) Filed: Mar. 2, 1998

(30) Foreign Application Priority Data

Mar. 10, 1997 (JP) .................................................. 9-054831

(51) Int. Cl.[7] .................................................. B29C 47/12
(52) U.S. Cl. .................... 425/380; 264/177.12; 425/461; 425/467
(58) Field of Search .............................. 425/133.1, 382 R, 425/461, 464, 380, 467; 264/177.12

(56) References Cited

U.S. PATENT DOCUMENTS

| | | | |
|---|---|---|---|
| 4,574,459 | * | 3/1986 | Peters .................................... 425/464 |
| 5,070,588 | * | 12/1991 | Miwa et al. . | |

FOREIGN PATENT DOCUMENTS

| | | |
|---|---|---|
| 0 017 686 A1 | 10/1980 | (EP) . |
| 0 029 287 A1 | 5/1981 | (EP) . |
| 0 276 083 A2 | 7/1988 | (EP) . |
| 0 389 253 A2 | 9/1990 | (EP) . |
| 60-145804 | 8/1985 | (JP) . |
| 61-39167 | 9/1986 | (JP) . |

* cited by examiner

*Primary Examiner*—Harold Pyon
*Assistant Examiner*—Joseph Leyson
(74) *Attorney, Agent, or Firm*—Parkhurst & Wendel, L.L.P.

(57) ABSTRACT

A honeycomb extrusion die 1 for extruding a honeycomb structural body, having: a plurality of intersecting slits 2 arranged in a front surface thereof, each of the slits 2 being formed by cell blocks 3; a plurality of raw material feeding holes 4 arranged in a back surface thereof, each of the raw material feeding holes 4 being communicated with the slits 2; and a round portion formed in corners 3a of each of the cell blocks 3; is disclosed. In the honeycomb extrusion die 1, each of the cell blocks 3 includes, a cell block body 11, a first coating layer 12 formed by electroless plating on the cell block body 11, and a second coating layer 13 formed by chemical vapor deposition on the first coating layer 12, and a width of each of the slits is 45–120 μm.

3 Claims, 3 Drawing Sheets

FIG_1a
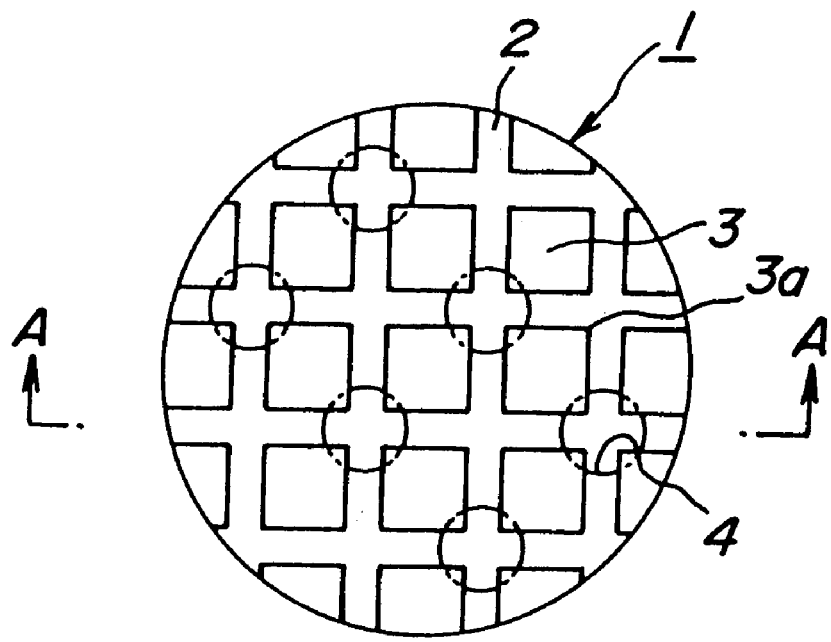
FIG_1b
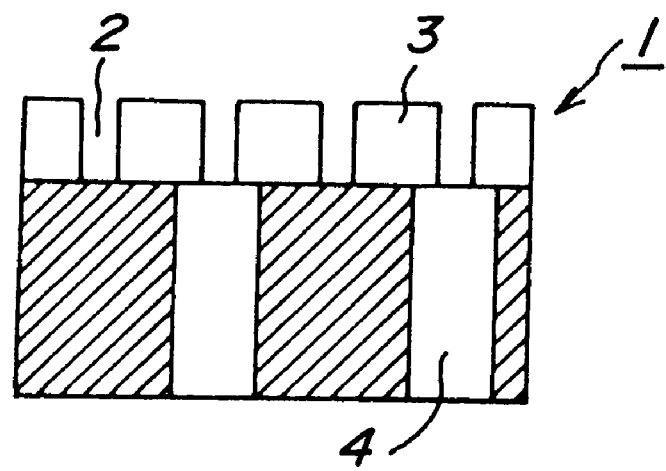

FIG_2
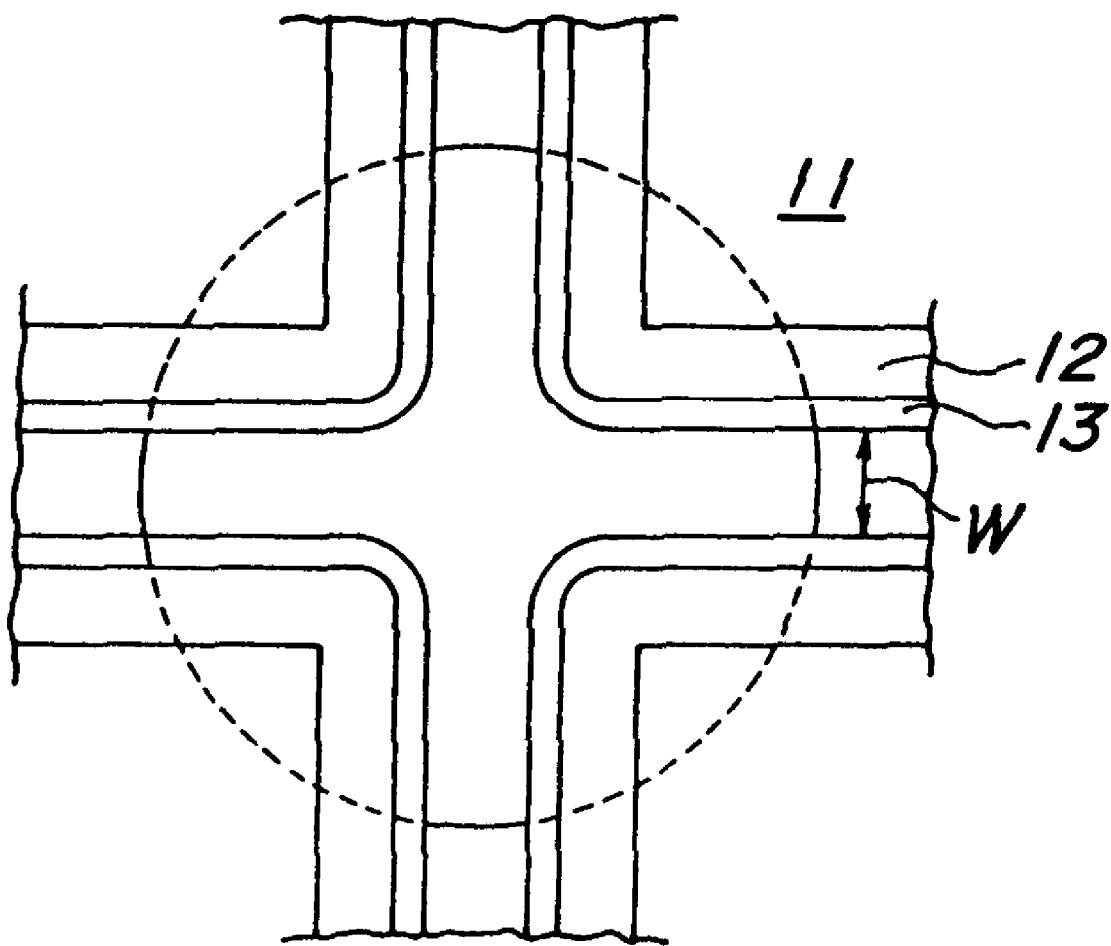

HONEYCOMB EXTRUSION DIE

BACKGROUND OF THE INVENTION

1. Field of the Invention

The present invention relates to a honeycomb extrusion die for extruding a ceramic honeycomb body and a method of manufacturing the same. Especially, the present invention relates to a honeycomb extrusion die and a method of manufacturing the same, in which a honeycomb structural body having a small pressure loss and a predetermined strength can be extruded in an accurate shape without transforming its shape during extruding.

2. Related Art Statement

Generally, as a honeycomb extrusion die for extruding a ceramic honeycomb body, a honeycomb extrusion die is known in which a plurality of intersection slits formed by cell blocks are arranged in a front surface thereof and a plurality of raw material holes communicated with the slits are arranged in a block surface thereof. As one example of the honeycomb extrusion die, the applicant proposes a technique in Japanese Patent Publication No. 61-39167 (JP-B-61-39167) in which each of the cell blocks has a round portion formed at corners thereof. Moreover, there is a technique in Japanese Patent Laid-Open Publication No. 60-145804 (JP-A-60-145804) in which each of the cell blocks is formed by coating iron boride, chromium carbide, aluminum oxide, titanium carbide, titanium nitride or titanium nitride carbide on a cell block body by means of chemical vapor deposition (CVD).

Recently, in order to meet a severe exhaust gas regulation or to improve exhaust gas purifying properties and honeycomb article properties, there is a requirement such that a ceramic honeycomb structural body after extrusion has a thin cell wall such as 45–120 $\mu$m which is thinner than the known cell wall thickness. Also, there is a requirement such that a honeycomb extrusion die for extruding a ceramic honeycomb body having such a thin cell wall and a method of manufacturing the same are developed.

However, in the technique disclosed in JP-B-61-39167 in which a slit width is controlled by electroless plating layer, there is a drawback such that a honeycomb extrusion die which can extrude a ceramic honeycomb structural body having a thin cell wall such as 45–120 $\mu$m is not obtained, if this technique is applied as it is.

Moreover, in the technique disclosed in JP-A-60-145804 in which a slit width defining a thickness of cell wall is controlled by chemical vapor deposition (CVD) layer, there are following drawbacks. That is to say, a thick coating layer is not formed only by CVD coating, and it is at most 30 $\mu$m as shown in JP-A-60-145804. Therefore, it is necessary to preliminarily work a metal block by means of for example electrical discharge machining or grinding so as to form a slit having a relatively small width. However, even if a thickness of CVD coating layer for finally controlling a slit width takes into consideration, it is not possible to perform such a preliminarily slit working only by the known electrical discharge machining or grinding. Moreover, it is not possible to form a round portion at corners of each of the cell blocks defining the slits only by CVD coating technique.

SUMMARY OF THE INVENTION

An object of the present invention is to eliminate the drawbacks mentioned above and to provide a honeycomb extrusion die and a method of manufacturing the same, in which a ceramic honeycomb structural body having a thin cell wall of 45–120 $\mu$m can be formed.

Another object of the present invention is to provide a honeycomb extrusion die and a method of manufacturing the same, in which a round portion is formed at corners of a cell block so as to increase a strength of a ceramic honeycomb structural body after extrusion and to improve a formability thereof.

According to the invention, a honeycomb extrusion die for extruding a honeycomb structural body, comprises: a plurality of intersecting slits arranged in a front surface thereof, each of the slits being formed by cell blocks; a plurality of raw material feeding holes arranged in a back surface thereof, each of the raw material feeding holes being communicated with the slits; and a round portion formed in corners of each of the cell blocks; wherein each of the cell blocks comprises, a cell block body, a first coating layer formed by electroless plating on the cell block body, and a second coating layer formed by chemical vapor deposition on the first coating layer, and wherein a width of each of the slits is 45–120 $\mu$m.

According to the invention, a method of manufacturing a honeycomb extrusion die for extruding a honeycomb structural body, comprises the steps of: forming a plurality of intersecting slits in a front surface of the extrusion die, each of the slits being defined by cell block bodies; forming a plurality of raw material feeding holes in a back surface of the extrusion die, each of the raw material feeding holes being communicated with the slits; forming a first coating layer on each of the cell block bodies by electroless plating; and forming a second coating layer on the first coating layer by chemical vapor deposition to provide a width of each of the slits of 45–120 $\mu$m.

In the present invention, a slit width is controlled by arranging the first coating layer made of preferably nickel plating layer formed by electroless plating and a second coating layer made of preferably TiCN or $W_2C$ coating layer formed by chemical vapor deposition on each of the cell block bodies worked preliminarily by the known electrical discharge machining or grinding. Therefore, a slit having a predetermined slit width can be obtained by making a slit width relatively narrower by the first coating layer formed by electroless plating, which can form a relatively thick layer, and then by arranging the second coating layer formed by CVD, which can only form a relatively thin layer, on the first coating layer. In this manner, it is possible to obtain a honeycomb extrusion die having a slit width of 45–120 $\mu$m which can form a ceramic honeycomb structural body having a thin cell wall such as 45–120 $\mu$m. Moreover, in the present invention, since the first coating layer is formed by electroless plating, corners of the first coating layer formed on the cell block body is naturally rounded. Then, since the thin second coating layer having a constant thickness is arranged on the first coating layer, it is possible to obtain a honeycomb extrusion die having a round portion at corners of each of the cell blocks and also maintaining a slit width of 45–120 $\mu$m can be obtained in an easy manner.

BRIEF DESCRIPTION OF THE DRAWING

FIGS. 1a and 1b are a plan view and a cross sectional view along A—A line respectively showing one embodiment of a honeycomb extrusion die according to the invention;

FIG. 2 is a partly enlarged schematic view illustrating one embodiment of the honeycomb extrusion die according to the invention.

DESCRIPTION OF THE PREFERRED EMBODIMENTS

Figure 3:
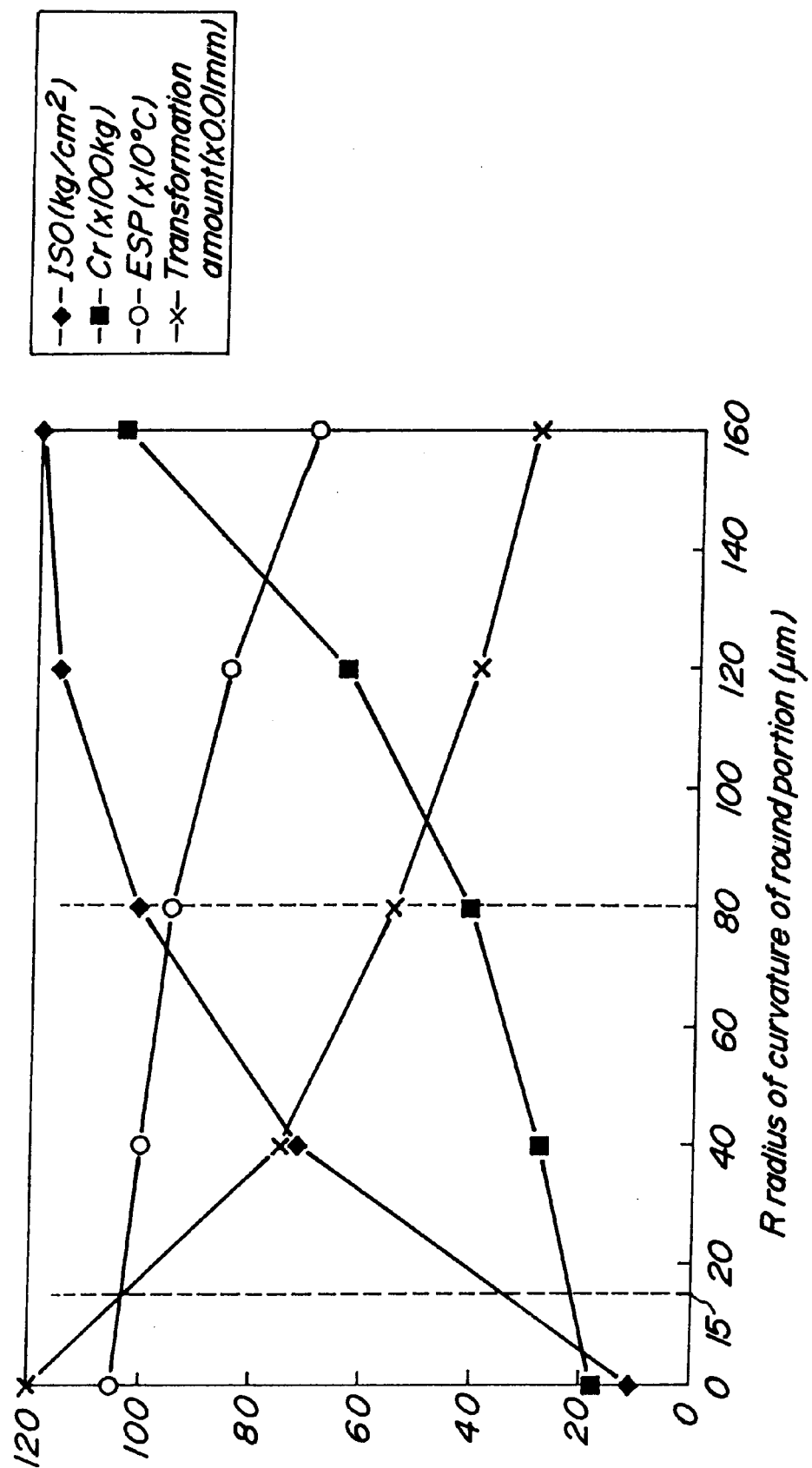
FIG. 3 is a graph depicting measuring results of the example according to the invention.

FIG. 1 is a schematic view showing one embodiment of a honeycomb extrusion die according to the invention. In FIG. 1, FIG. 1a is a plan view illustrating a part thereof and FIG. 1b is a cross sectional view depicting A—A line in FIG. 1a. In the embodiment shown in FIGS. 1a and 1b, a honeycomb extrusion die 1 comprises a plurality of intersecting slits 2 arranged in a front surface of the honeycomb extrusion die 1, which are formed by cell blocks 3, and a plurality of raw material feeding holes 4 arranged in a back surface of the honeycomb extrusion die 1, which are communicated with the slits 2 at intersecting positions of the slits 2. Raw materials to be extruded are supplied into the honeycomb extrusion die 1 through the raw material feeding holes 4 arranged in a back surface, and a honeycomb structural body is extruded from the slits 2 arranged in a front surface.

Features of the honeycomb extrusion die 1 according to the invention, as shown in FIG. 2, each of the cell blocks 3 comprises a cell block body 11, a first coating layer 12 formed by electroless plating preferably nickel electroless plating on the cell block body 11, and a second coating layer 13 formed by chemical vapor deposition preferably TiCN or $W_2C$ chemical vapor deposition on the first coating layer 12. In this manner, a round portion is formed at corners 3a of each of the cell blocks 3, and a slit width W is set to 45–120 $\mu$m.

In this embodiment, since a total thickness of the first coating layer 12 and the second coating layer 13 is not particularly limited. However, since it is necessary to form a round portion on the corners of the cell blocks 3 by electroless plating, since a CVD coating layer formed by chemical vapor deposition has an excellent wear resistance but does not form a thick layer due to its film formation mechanism, and since formations of the first coating layer 12 formed by electroless plating and the second coating layer 13 formed by chemical vapor deposition are complicated and requires a large cost and thus such a total thickness mentioned above is desired to be as thin as possible, it is preferred to set such a total thickness to 20–70 $\mu$m. Moreover, a radius of curvature of the round portion is not particularly limited. However, for a convenience of manufacturing and for achieving a required strength, it is preferred to set a radius of curvature of the round portion to 15–80 $\mu$m.

In the honeycomb extrusion die 1 according to the invention having the construction mentioned above, it is possible to form a die having a slit width W of 45–120 $\mu$m, which is not formed only by electroless plating. That is to say, a first coating layer 12 is formed by electroless plating to a maximum thickness which can be achieved by electroless plating so as to obtain a preliminary slit width W, and the preliminary slit width W is made narrower by forming a second coating layer 13 on the first coating layer 12 by chemical vapor deposition. Therefore, if the honeycomb extrusion die 1 according to the invention is used, it is possible to extrude a ceramic honeycomb structural body having a thin cell wall in which a thickness of the cell wall is 45–120 $\mu$m. The thus extruded honeycomb structural body having a cell wall thickness of 45–120 mm is weak on its strength since it has a thin cell wall. In order to eliminate this drawback, the honeycomb extrusion die 1 according to the invention has a round portion at intersecting positions of the cell walls. In the present invention, since the first coating layer 12 is formed on the cell block body 11 by electroless plating, the round portion can be formed naturally at portions corresponding to the corners of each of the cell block bodies 11. A radius of curvature of the round portion can be arbitrarily adjusted by varying a concentration of electrolyte solution, plating materials, and so on.

The honeycomb extrusion die 1 according to the invention can be formed as follows. At first, one surface of a cell block body 11 is subjected to electrical discharge machining (EDM) and/or grinding to form a predetermined number of slits 2 intersecting in X and Y directions. Each of the slits 2 has a predetermined width W and a predetermined length. Then, the thus worked cell block body 11 having a plurality of intersecting slits 2 is subjected to electroless plating preferably Ni electroless plating to form a first coating layer 12 having a predetermined thickness on the cell block body 11. The first coating layer 12 has a round portion having a predetermined radius of curvature positioned at portions corresponding to corners 3a of each of the cell block 3. Then, the cell block body 11 having the first coating layer 12 is subjected to chemical vapor deposition (CVD) preferably TiC or $W_2C$ CVD to form a second coating layer 13 on the first coating layer 12. Further, the other surface of the cell block body 11 is subjected to electrical chemical machining (ECM) to form raw material feeding holes 4 communicated with intersecting portions of the slits 2. In the manner mentioned above, it is possible to obtain the honeycomb extrusion die 1 having a predetermined slit width and a round portion with a predetermined radius of curvature. In the manufacturing mentioned above, it is preferred to set a slit width W formed by EDM and/or grinding to 15–300 $\mu$m. Moreover, it is preferred to set a thickness of the first coating layer 12 formed by electroless plating preferably Ni electroless plating to 10–70 $\mu$m. Further, it is preferred to set a thickness of the second coating layer 13 formed by CVD preferably TiCN or $W_2C$ CVD to 5–30 $\mu$m.

Hereinafter, actual examples will be explained.

EXAMPLE 1

A plate member made of C-450 stainless steel was worked by a lathe and a grinding machine to obtain a square plate having a thickness of 15 mm and one side length of 215 mm. One main surface of the square plate was subjected to electrical discharge machining (EDM) and grinding to form 226 slits arranged parallel with each other. Each of the slits had a width of 180 $\mu$m and a length of 3.0 mm and a pitch of the slits was 0.94 mm. Moreover, slits intersecting the thus formed slits were formed in the same surface of the square plate in the same manner as mentioned above. Then, the other main surface of the square plate was subjected to electrical chemical machining (ECM) to form holes at every other intersecting positions of the slits. Each of the holes had a diameter of 0.70 mm, a length of 12.3 mm, and a pitch of 0.94 mm. The number of the holes was (226×226)/2=about 26000.

Then, for an installation to a forming apparatus, the square plate having intersecting slits and holes was subjected to EDM to obtain a circular die having an outer diameter of 215 mm. Then, the thus obtained die was subjected to Ni electroless plating to form an Ni plating layer having a thickness of 25 $\mu$m. Further, the die was subjected to TiCN chemical vapor deposition to form a TiCN CVD layer having a thickness of 10 $\mu$m. As a result, a honeycomb extrusion die, in which a slit width W was 180–(25+10)×2=110 $\mu$m and a round portion with a radius of curvature of 25+10=35 $\mu$m was performed at corners of each of the cell blocks, could be obtained. By using the thus obtained honeycomb extrusion die, a honeycomb structural body made of cordierite was extruded and the thus extruded cordierite honeycomb structural body having a cell wall thickness of 100 μm.

EXAMPLE 2

In order to investigate an effect of a radius of curvature of the round portion, honeycomb extrusion dies with a radius of curvature of the round portion (μm) of 0, 40, 80, 120 and 160 respectively were manufactured in the same manner as that of the Example 1. By using the thus manufactured honeycomb extrusion dies, honeycomb structural bodies were extruded, and the thus extruded honeycomb structural bodies were dried and fired to form honeycomb structural bodies as an article having a cell wall thickness of 100 μm. With respect to the thus formed honeycomb structural bodies, isostatic strength test (ISO), compression strength test (Cr), thermal shock resistance test (electrical furnace spooling, ESP), and transformation amount test were performed. The results were shown in the following Table 1 and also in FIG. 3.

Here, the isostatic strength test (ISO) was performed by setting the honeycomb structural body in water, applying an isostatic pressure to the honeycomb structural body by applying a pressure to water, and measuring a fracture strength of the honeycomb structural body (ISO strength). If the honeycomb structural body becomes stronger, i.e., if a radius of curvature of the round portion of the cell wall becomes larger, the ISO strength becomes stronger. The ISO strength is used for determining whether the honeycomb structural body is endured or not to an isostatic pressure generated when the honeycomb structural body is set in a can of an engine exhaust system.

Moreover, the compression strength test (Cr) was performed by surrounding the honeycomb structural body by a wire mesh so as to apply an isostatic pressure to the honeycomb structural body, applying a pressure from an upper side of the honeycomb structural body by means of a compression test apparatus, and measuring a fracture strength of the honeycomb structural body as Cr strength (crushing strength). If the honeycomb structural body becomes stronger on its construction, i.e., if a radius of curvature of the cell wall becomes larger the Cr strength becomes stronger. The Cr strength is used for determining whether the honeycomb structural body is endured or not to an outer stress such as a vibration during travelling, when the honeycomb structural body is installed in automobiles.

Furthermore, the thermal shock resistance test (ESP) was performed by applying a thermal shock (heating/cooling) to the honeycomb structural body, and measuring a strength with respect to the thus applied thermal shock (ESP strength). That is to say, if a temperature difference from a room temperature till a fracture generation of the honeycomb structural body is larger, the honeycomb structural body becomes stronger. The ESP strength is used for determining whether the honeycomb structural body is endured or not to a heating such that it is exposed in a high temperature exhaust gas from an engine or to a cooling due to an engine stop, when the honeycomb structural body is installed in automobiles. In this case, the thermal shock becomes smaller if the honeycomb structural body has an even shape i.e. if a radius of curvature of the round portion of the cell wall becomes smaller. Moreover, is the round portion at the cell intersecting portion becomes smaller, a heat capacity becomes even and the ESP strength becomes higher.

Moreover, the transformation amount test was performed by measuring a difference between the standard value and the actually measured value of an outer dimension of the honeycomb structural body, as a transformation amount. The dimension was measured by means of an automatic dimension measuring apparatus utilizing a laser or by means of a caliper. If the honeycomb structural body is weal on its construction i.e. if a radius of curvature of the round portion of the cell wall becomes smaller, the honeycomb structural body is transformed (a kind of crush) during extruding due to its weight, and thus the honeycomb structural body is not within a dimensional tolerance after firing. The transformation amount is used for examining whether the honeycomb structural body can be precisely set in a can of an engine exhaust system or not.

TABLE 1

| R (μm) | 0 | 40 | 80 | 120 | 160 |
|---|---|---|---|---|---|
| ISO (kg/cm$^2$) | 11 | 72 | 101 | 116 | 120 |
| Cr (×100 kg) | 18 | 28 | 41 | 64 | 105 |
| ESP (×10° C.) | 105 | 100 | 95 | 85 | 70 |
| Transformation amount (×0.01 mm) | 120 | 75 | 55 | 40 | 30 |

From the results shown in Table 1 and FIG. 3, it is understood that, if a radius of curvature of the round portion becomes larger, the Cr strength, the ISO strength, and the transformation amount are improved, but the ESP is not improved. Therefore, a preferable range of a radius of curvature of the round portion can be obtained from a range in which all the parameters mentioned above are almost in a excellent state. In this case, target properties of the honeycomb structural body as an article are shown in the following Table 2.

TABLE 2

|  | Target properties |
|---|---|
| ISO (kg/cm$^2$) | more than 10 |
| Cr (kg) | more than 1500 |
| ESP (° C.) | more than 750 |
| Transformation amount (mm) | more than 1.1 |

If a range satisfying the target properties shown in Table 2 is determined from FIG. 3, a radius of curvature of the round portion can be obtained as 15–80 μm, and it is understood that this range is preferred as for a radius of curvature of the round portion.

As clearly understood from the above explanations, according to the invention, the first coating layer formed by electroless plating preferably Ni electroless plating is arranged on the cell block body formed by the known electrical discharge machining or grinding, and the second coating layer formed by CVD preferably TiCN or W$_2$C CVD is arranged on the first coating layer, so as to control a slit width. Therefore, a slit width having a predetermined slit width can be obtained by making a slit width relatively narrower by the thick first coating layer formed by CVD on the first coating layer. In this manner, it is possible to obtain a honeycomb extrusion die having a slit width of 45–120 μm which can form a ceramic honeycomb structural body having a thin cell wall such as 45–120 μm.

Moreover, in the present invention, since the first coating layer is formed by electroless plating, corners of the first coating layer formed on the cell block body is naturally rounded. Then, since the thin second coating layer having a constant thickness is arranged on the first coating layer, it is possible to obtain a honeycomb extrusion die having a round portion at corners of each of the cell blocks and also maintaining a slit width of 45–120 μm can be obtained in an easy manner.

What is claimed is:

1. A honeycomb extrusion die for extruding a honeycomb structural body, comprising:

a plurality of intersecting slits arranged in a front surface thereof, each of the slits being formed by cell blocks;

a plurality of raw material feeding holes arranged in a back surface thereof, each of the raw material feeding holes being communicated with the slits; and a round portion formed in corners of each of the cell blocks;

wherein each of the cell blocks comprises, a cell block body, a first coating layer which comprises Ni and is formed by electroless plating on the cell block body, and a second coating layer of $W_2C$ and is formed by chemical vapor deposition on the first coating layer, and wherein a width of each of the slits is 45–120 μm.

2. The honeycomb extrusion die according to claim 1, wherein a total thickness of the first coating layer and the second coating layer is 20–70 μm.

3. The honeycomb extrusion die according to claim 1, wherein a radius of curvature of the round portion is 15–80 μm.

* * * * *